(12) United States Patent
Shimizu

(10) Patent No.: US 8,819,401 B2
(45) Date of Patent: Aug. 26, 2014

(54) SEMICONDUCTOR DEVICE AND RESET CONTROL METHOD IN SEMICONDUCTOR DEVICE

(75) Inventor: Yuichiro Shimizu, Yokohama (JP)

(73) Assignee: Spansion LLC, Sunnyvale, CA (US)

( * ) Notice: Subject to any disclaimer, the term of this patent is extended or adjusted under 35 U.S.C. 154(b) by 461 days.

(21) Appl. No.: 13/213,241

(22) Filed: Aug. 19, 2011

(65) Prior Publication Data

US 2012/0124407 A1    May 17, 2012

(30) Foreign Application Priority Data

Nov. 12, 2010 (JP) .................................. 2010-254099

(51) Int. Cl.
*G06F 19/00* (2011.01)

(52) U.S. Cl.
USPC .................................. 713/1; 713/2

(58) Field of Classification Search
None
See application file for complete search history.

(56) References Cited

U.S. PATENT DOCUMENTS

| 5,537,655 | A  | * | 7/1996  | Truong ............................ 714/12 |
| 7,594,211 | B1 | * | 9/2009  | Tian et al. ...................... 716/113 |
| 7,626,420 | B1 | * | 12/2009 | Cohen .............................. 326/46 |
| 2010/0138640 | A1 | * | 6/2010 | Gilday et al. ..................... 713/1 |

FOREIGN PATENT DOCUMENTS

JP    5-012455 A    1/1993

\* cited by examiner

*Primary Examiner* — Paul Yanchus, III
(74) *Attorney, Agent, or Firm* — Sterne, Kessler, Goldstein & Fox P.L.L.C.

(57) ABSTRACT

Reset request from external are held at a reset request holding unit having holding units connected in series; a reset switching unit performs a logical product operation of all of outputs of the holding units to set it as an asynchronous reset request, setting an output of the holding unit at a final stage of the holding units as a synchronous reset request, performing a logical product operation of the asynchronous reset request and the synchronous reset request, and outputs an operation result; the asynchronous reset request is masked in a synchronous reset mode; and a reset signal is output from a reset output unit based on the operation result at the reset switching unit.

13 Claims, 9 Drawing Sheets

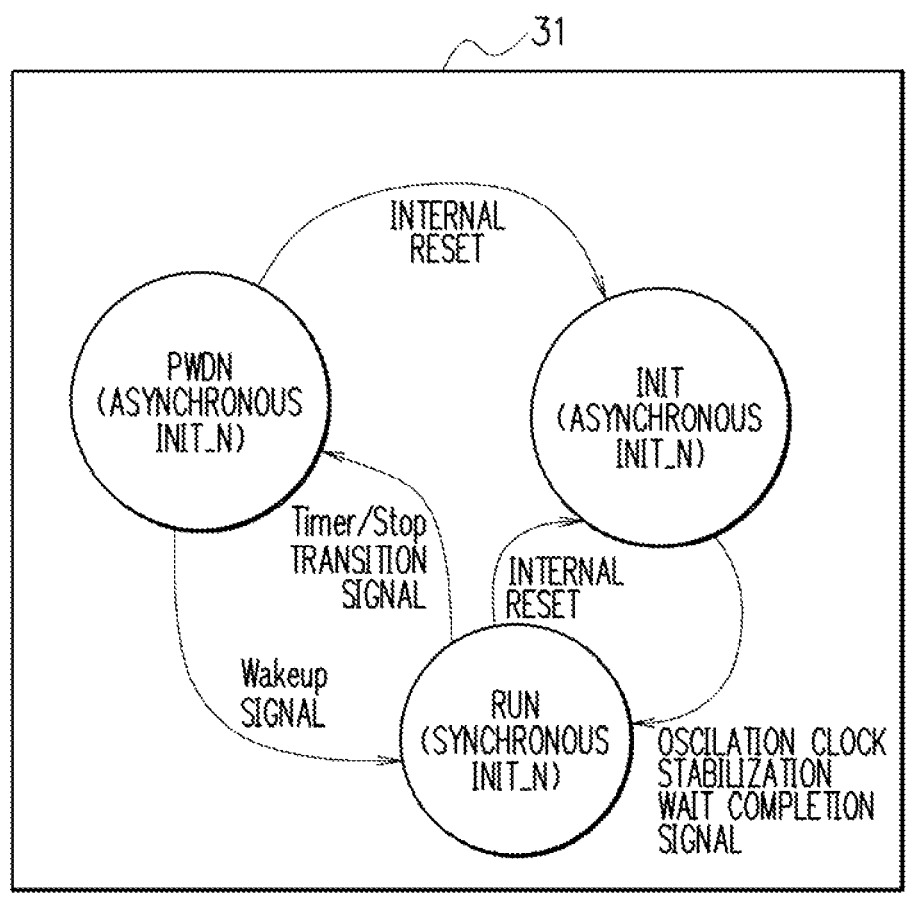
F I G. 4

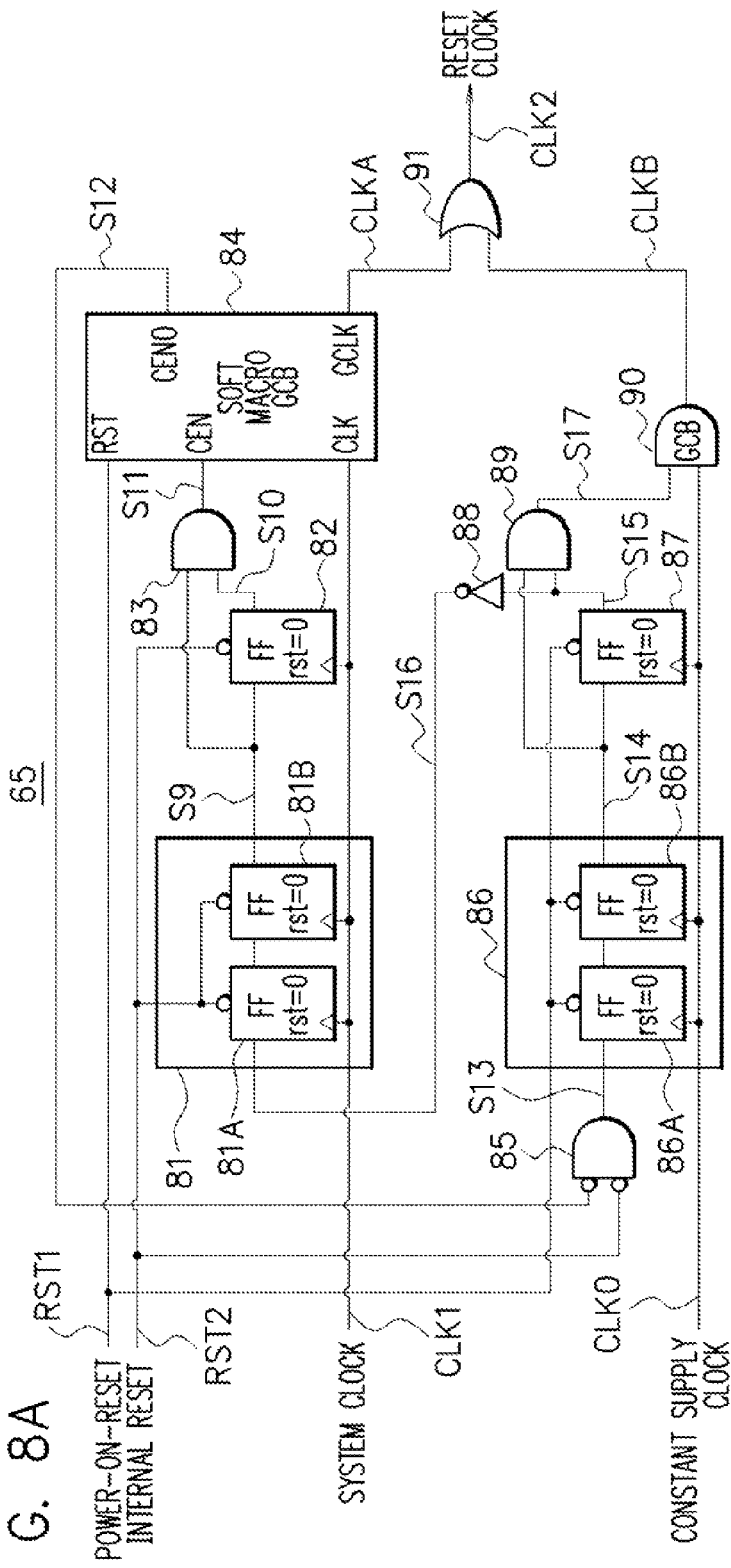
F I G. 8A
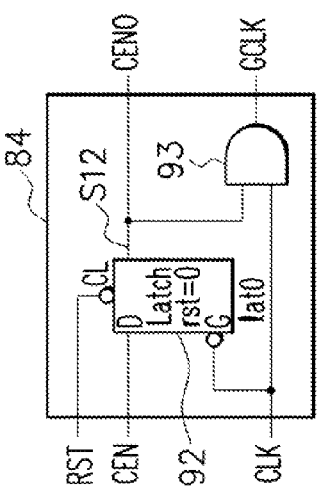
F I G. 8B

F I G. 9
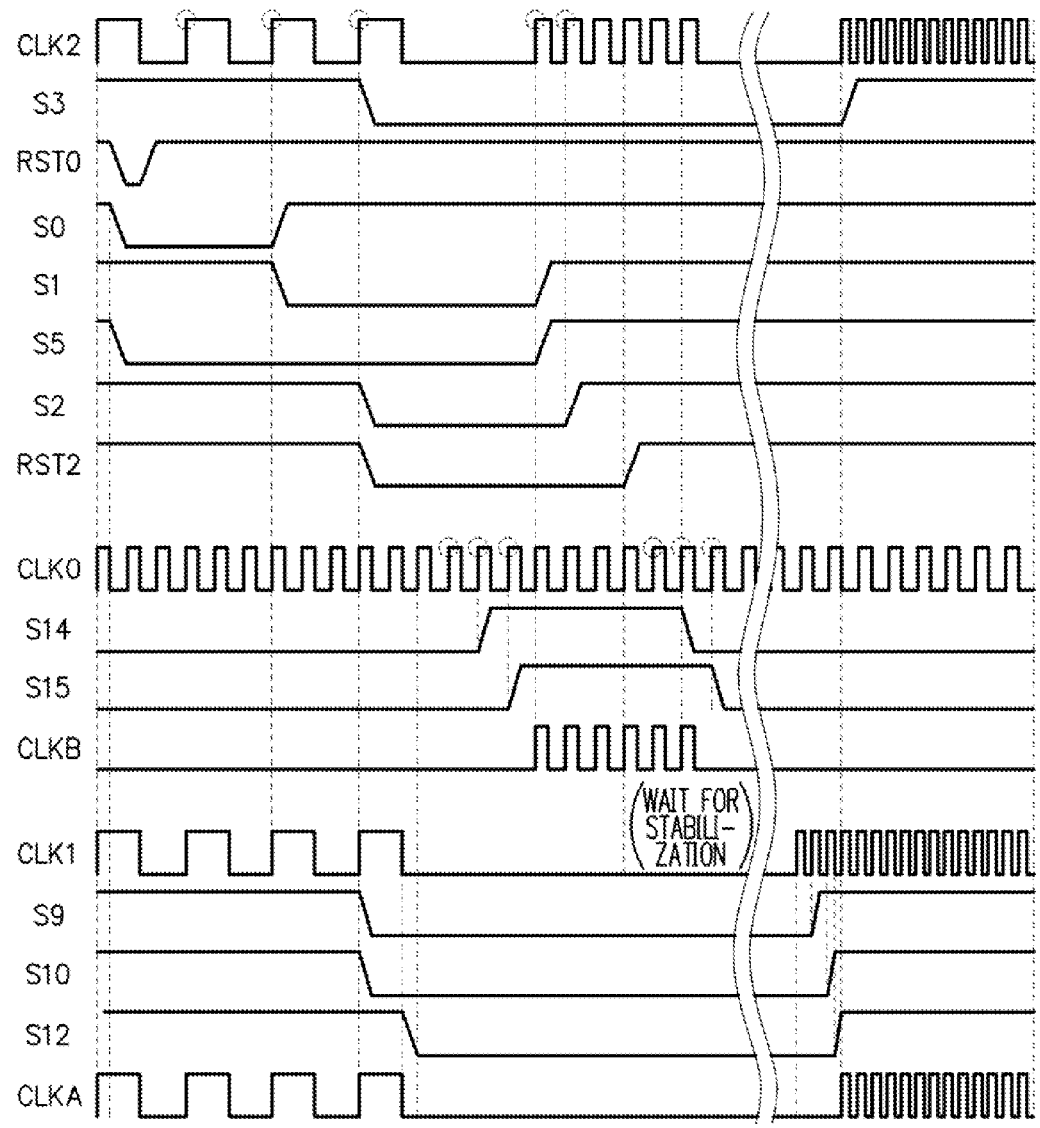

US 8,819,401 B2

SEMICONDUCTOR DEVICE AND RESET CONTROL METHOD IN SEMICONDUCTOR DEVICE

CROSS-REFERENCE TO RELATED APPLICATION

This application is based upon and claims the benefit of priority of the prior Japanese Patent Application No. 2010-254099, filed on Nov. 12, 2010, the entire contents of which are incorporated herein by reference.

FIELD

The embodiments discussed herein are directed to a semiconductor device and a reset control method in the semiconductor device.

BACKGROUND

A clock reset generation circuit mounted on a semiconductor integrated circuit has functions generating a system clock supplied to respective function units inside a chip while using an oscillation clock as an input, and generating an internal reset supplied to the respective function units by receiving a reset request from internal or external. In a conventional clock reset generation circuit, an internal reset signal is asynchronously asserted by the reset request and so on from external.

However, it becomes necessary in recent years to assert the internal reset signal in synchronous with the system clock when the reset request from external is input under a state in which the system clock is supplied inside the chip. One of reasons is to keep data (to prevent data damage) stored in an on-chip RAM.

The assertion of the internal reset signal in synchronous with the system clock is generally performed by synchronizing the reset request from external by flip-flop, and by controlling the system clock by a gated clock buffer so that the clock does not become a noise by the assertion of the reset signal. (For example, refer to Japanese Laid-open Patent Publication No. 05-12455.)

However, there is a case when the system clock is not supplied to the clock reset generation circuit for a microcontroller depending on an operation state. In this case, it is impossible to correspond to the reset request from external only by the function asserting the internal reset signal in synchronization with the system clock. Accordingly, a mechanism becomes necessary switching between a case when the internal reset signal is synchronously asserted under the operation state when the system clock is supplied to the clock reset generation circuit and a case when the internal reset signal is asynchronously asserted under the operation state when the system clock is not supplied to the clock reset generation circuit.

The synchronization/asynchronization switching mechanism has to be able to surely assert the internal reset signal in accordance with the reset request from external even at a timing switching the synchronization and asynchronization in addition to prevent that glitch occurs at the switching timing. Besides, if a reset factor based on the reset request from external remains inside the clock reset generation circuit when the internal reset signal is negated, the internal reset signal is asserted by a subsequent supply of the system clock. Accordingly, it is desired that the reset factor based on the reset request from external does not remain inside the clock reset generation circuit when the internal reset signal is negated.

SUMMARY

According to an aspect of the embodiment, a semiconductor device including: a reset request holding unit that has a plurality of holding units connected in series and holds reset request from external; a reset switching unit that performs a logical product operation of all of outputs of the plurality of holding units to set it as an asynchronous reset request, sets an output of the holding unit at a final stage of the plurality of holding units as a synchronous reset request, performs the logical product operation of the asynchronous reset request and the synchronous reset request, outputs an operation result of the logical product operation, and masks the asynchronous reset request in a synchronous reset mode; and a reset output unit that outputs a reset signal based on the operation result at the reset switching unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a transition of operation states;

FIG. 8A is a diagram illustrating a circuit configuration example of a clock switching unit in the present embodiment;

FIG. 8B is a diagram illustrating a circuit configuration example of a gated clock buffer macro in the present embodiment; and FIG. 9 is a diagram illustrating an example of operational waveforms of the reset generation unit in the present embodiment.

DESCRIPTION OF EMBODIMENTS

Hereinafter, embodiments are described based on accompanying drawings.

Figure 1:
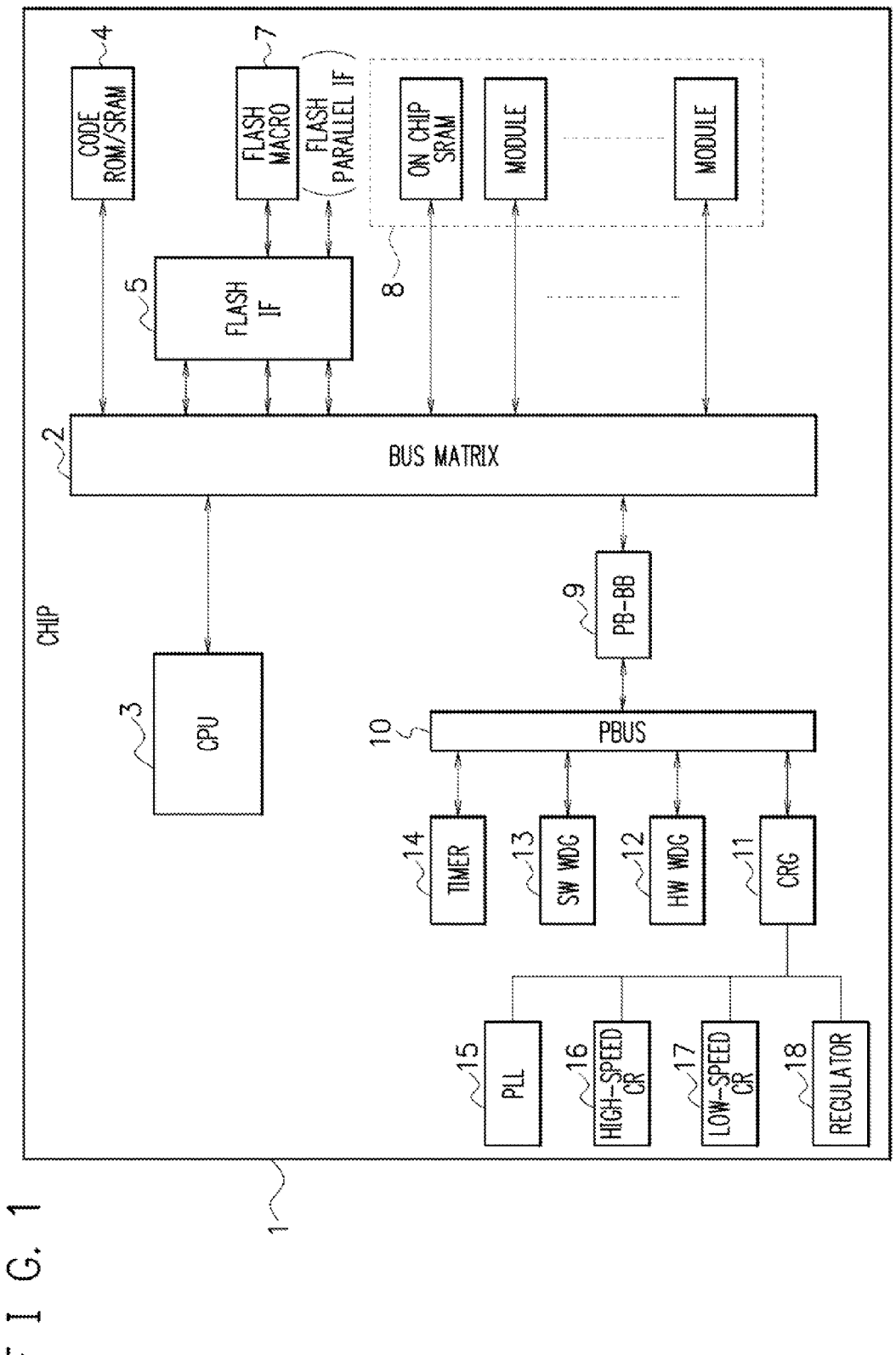
FIG. 1 is a diagram illustrating a configuration example of a microcontroller to which a semiconductor device is applied.

FIG. 1 is a diagram illustrating a configuration example of a microcontroller to which a semiconductor device is applied. In FIG. 1, a reference numeral 1 is a chip on which respective function units held by the microcontroller are mounted.

A reference numeral 3 is a CPU (Central Processing Unit), and a reference numeral 4 is a code memory to which program codes and so on are stored. The CPU 3 and the code memory 4 are each connected to a bus 2. For example, the CPU 3 executes a certain process or totally controls respective function units inside the microcontroller by reading and executing the program codes from the code memory 4.

A reference numeral 7 is a flash memory macro. The flash memory macro 7 is connected to the bus 2 via a flash memory interface 5, and writing and reading of various data and so on are performed in accordance with a request from the CPU 3 and so on. Besides, a flash parallel interface is connected to the bus 2 via the flash memory interface 5.

A reference numeral 8 represents various modules connected to the bus 2. Each of the modules 8 is, for example, an on-chip RAM (Random Access Memory), a master module, a slave module, an external memory interface, an external device interface, and so on.

A reference numeral 9 is a bus bridge controlling transfer of various signals between the bus 2 and a peripheral bus 10. Note that the bus 2 is a bus in relatively high-speed so-called as a high performance bus, and the peripheral bus 10 is a bus in low-speed compared to the bus 2.

A reference numeral 11 is a clock reset generation circuit. The clock reset generation circuit 11 generates a system clock supplied to the respective function units inside the chip while using an oscillation clock as an input. The clock reset generation circuit 11 generates an internal reset supplied to the respective function units by receiving a reset request from internal or external. Besides, the clock reset generation circuit 11 detects whether or not the input oscillation clock is stopped.

A reference numeral 12 is a watchdog timer in hardware, a reference numeral 13 is a watchdog timer in software, and a reference numeral 14 is a timer. Each of the clock reset generation circuit 11, the watchdog timers 12, 13, and the timer 14 is connected to the peripheral bus 10.

A reference numeral 15 is a PLL (Phase Locked Loop) circuit, a reference numeral 16 is a high-speed CR oscillation circuit oscillating a clock in high frequency, and a reference numeral 17 is a low-speed CR oscillation circuit oscillating a clock in low frequency. Each of the PLL circuit 15, the high-speed CR oscillation circuit 16, the low-speed CR oscillation circuit 17 supplies the oscillation clock to the clock reset generation circuit 11. A reference numeral 18 is a regulator. The regulator 18 converts an input voltage into an output voltage to output. The regulator 18 outputs a power-on-reset request to the clock reset generation circuit 11.

Figure 2:
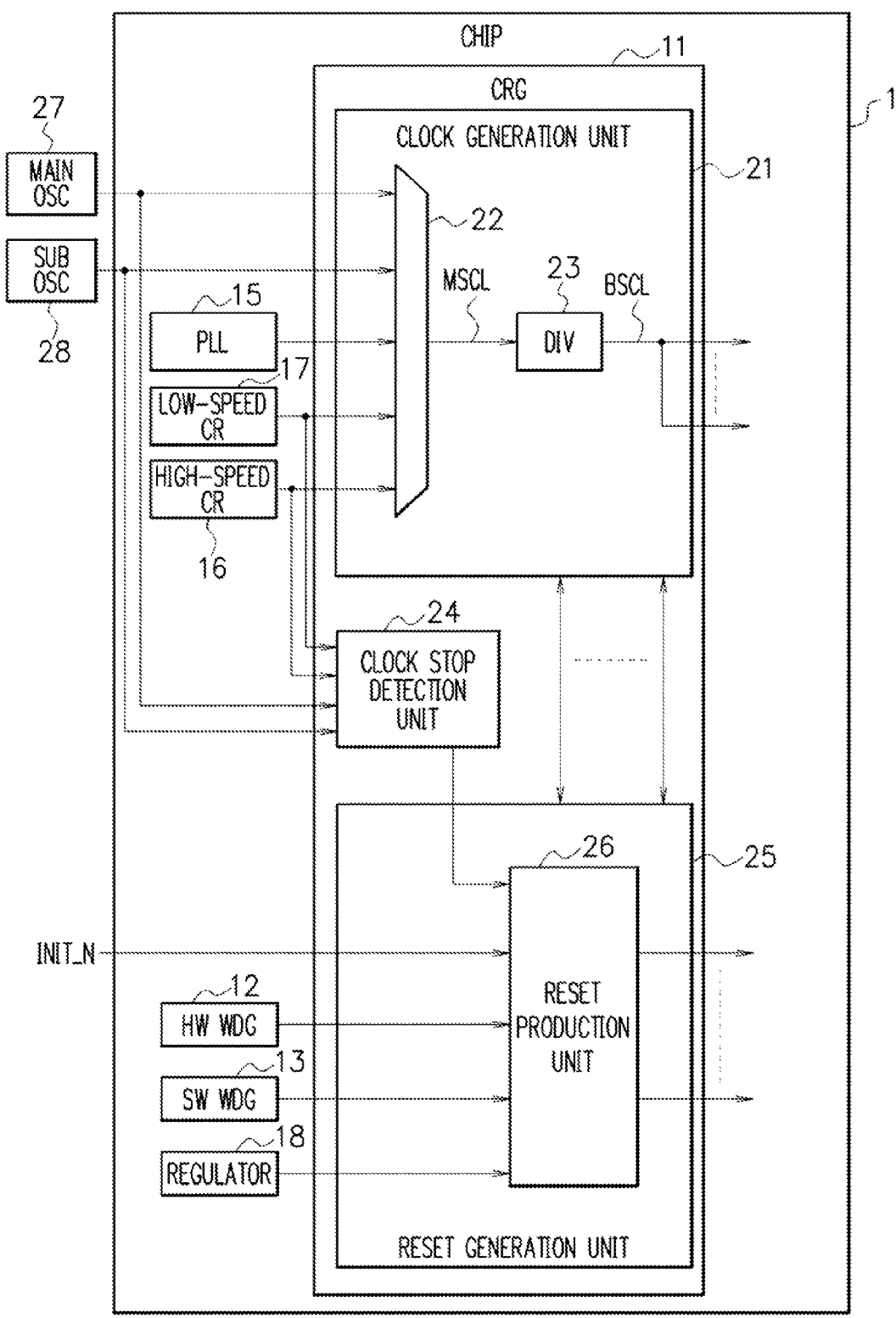
FIG. 2 is a diagram illustrating a configuration example of a clock reset generation circuit in the present embodiment.

FIG. 2 is a diagram illustrating a configuration example of the clock reset generation circuit 11 illustrated in FIG. 1. In FIG. 2, the same reference numerals and symbols are used to designate the same and corresponding components as the components illustrated in FIG. 1. As illustrated in FIG. 2, the clock reset generation circuit 11 includes a clock generation unit 21, a clock stop detection unit 24, and a reset generation unit 25.

The clock generation unit 21 generates and outputs the system clock while using the oscillation clock as the input. The clock generation unit 21 includes a selector 22 and a frequency divider 23. The oscillation clock oscillated from each of an external main oscillator 27, an external sub oscillator 28, the PLL circuit 15, the high-speed CR oscillation circuit 16, and the low-speed CR oscillation circuit 17 is input to the selector 22. The selector 22 selects the input oscillation clock, and outputs as a master clock MSCL. The master clock MSCL output from the selector 22 is input to the frequency divider 23. The frequency divider 23 divides the master clock MSCL with a specified frequency division ratio to output as a base clock BSCL. This base clock BSCL (it may be the master clock MSCL) is supplied from the clock generation unit 21 to the respective function units (CPU, modules and so on) inside the microcontroller as the system clock.

The oscillation clock oscillated from each of the external main oscillator 27, the external sub oscillator 28, the high-speed CR oscillation circuit 16, and the low-speed CR oscillation circuit 17 is input to the clock stop detection unit 24. The clock stop detection unit 24 detects whether or not the oscillation clock is stopped.

The reset generation unit 25 includes a reset production unit 26, and generates and outputs a reset signal by receiving the reset request from internal or external. A reset request (INIT_N) from external, and a clock stop detection reset request from the clock stop detection unit 24 are input to the reset production unit 26. Besides, a hardware watchdog reset request from the watchdog timer 12, a software watchdog reset request from the watchdog timer 13, and the power-on-reset request from the regulator 18 are input to the reset production unit 26. The reset production unit 26 generates the reset signals in accordance with these reset requests, and outputs the generated reset signals to the respective function units (CPU, modules and so on) inside the microcontroller.

Figure 3:
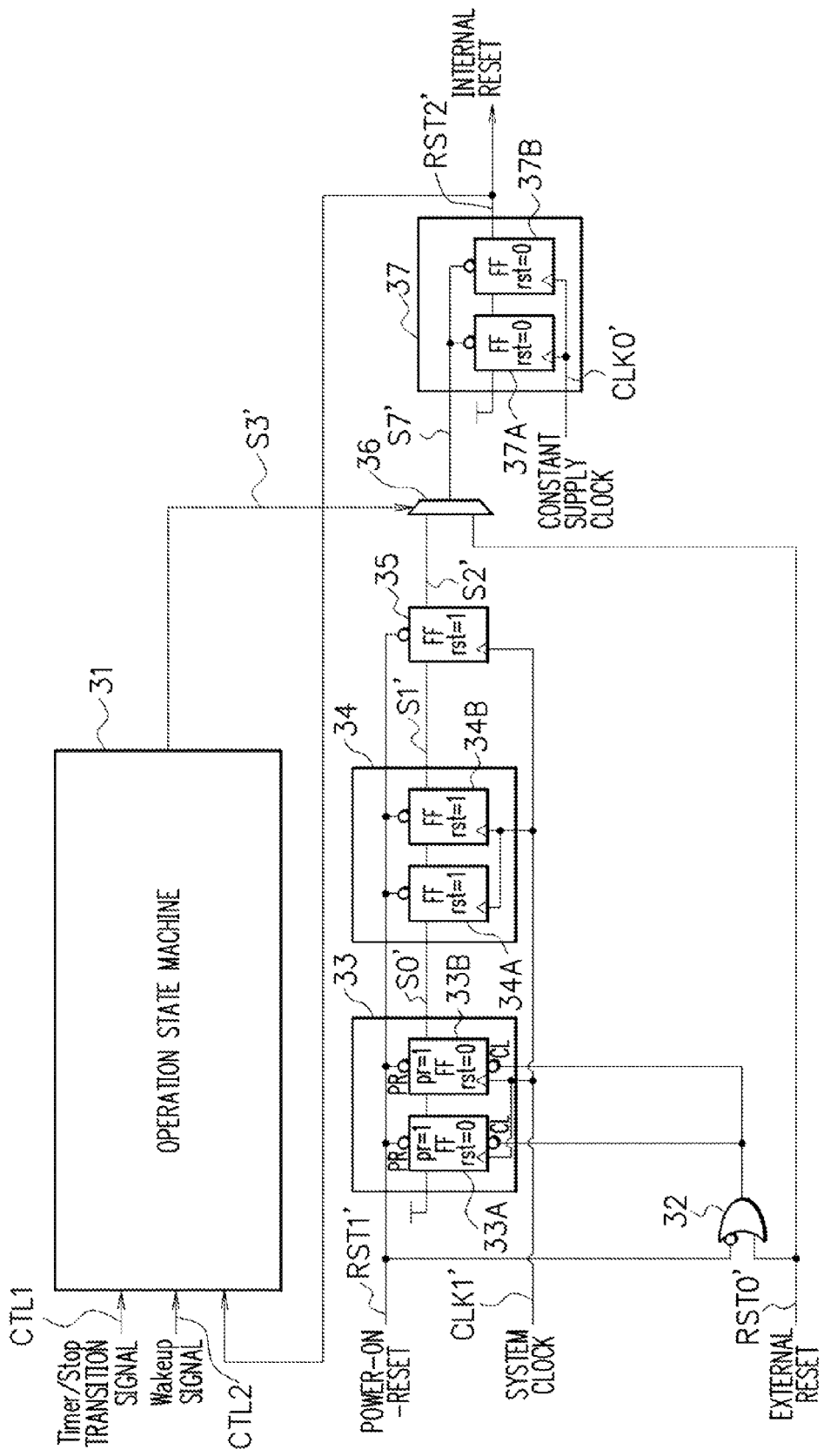
FIG. 3 is a diagram illustrating a configuration example of a reset generation unit.

FIG. 3 is a diagram illustrating a configuration example of the reset generation unit. In the reset generation unit illustrated in FIG. 3, a mechanism synchronously asserting the internal reset signal and a mechanism asynchronously asserting the internal reset signal when the reset request from external is input are simply combined, and the mechanisms are switched in accordance with operation states.

The reset generation unit illustrated in FIG. 3 includes an operation state machine 31, an OR circuit (logical sum operation circuit) 32, clock transfer circuits 33, 34, 37, a flip-flop 35, and a selector 36.

A Timer/Stop transition signal CTL1, a Wakeup signal CTL2, an internal reset signal RST2' and so on are input to the operation state machine 31. The operation state machine 31 controls the operation state in accordance with these signals. As illustrated in FIG. 4, the operation state machine 31 transfers the operation state into "RUN" if an oscillation clock stabilization wait completion signal representing that the oscillation clock is stabilized is input when the operation state is "INIT". Besides, the operation state machine 31 transfers the operation state into "INIT" if the internal reset signal RST2' is input when the operation state is "RUN". The operation state machine 31 transfers the operation state into "PWDN" if the Timer/Stop transition signal CTL1 is input when the operation state is "RUN". Further, the operation state machine 31 transfers the operation state into "INIT" if the internal reset signal RST2' is input when the operation state is "PWDN". The operation state machine 31 transfers the operation state into "RUN" if the Wakeup signal CTL2 is input when the operation state is "PWDN".

Here, the operation state "INIT" is an operation state corresponding to an initial state, and the system clock is not supplied at this time. The operation state "RUN" is an operation state corresponding to a state in which a processing operation is executable, and the system clock is supplied at this time. The operation state "PWDN" is an operation state corresponding to so-called a power-down-mode.

Besides, the operation states "INIT" and "PWDN" are asynchronous reset modes asynchronously asserting the internal reset signal when the reset request from external is input, and the operation state "RUN" is a synchronous reset mode synchronously asserting the internal reset signal when the reset request from external is input. The operation state machine 31 outputs a signal S3' while setting it at low level ("L") in the asynchronous reset mode, and outputs the signal S3' while setting it at high level ("H") in the synchronous reset mode.

A power-on-reset request signal RST1' is inverted and input to the OR circuit 32, and an external reset request signal RST0' is input thereto, and the OR circuit 32 outputs an operation result thereof. Namely, the OR circuit 32 outputs "L" when the power-on-reset request signal RST1' is not asserted ("L") and the external reset request signal RST0' is asserted.

The clock transfer circuit 33 includes flip-flops 33A, 33B with clear and preset connected in series. The output of the OR circuit 32 is input to a clear terminal, and the power-on-reset request signal RST1' is input to a preset terminal of each of the flip-flops 33A, 33B. Besides, the clock transfer circuit 34 includes flip-flops 34A, 34B connected in series, and an output of the clock transfer circuit 33 is input thereto. The power-on-reset request signal RST1' is also input to the flip-flops 34A, 34B. An output of the clock transfer circuit 34 and the power-on-reset request signal RST1' are input to the flip-flop 35. A system clock CLK1' is input to the above-stated each of the flip-flops 33A, 33B, 34A, 34B, and 35 as a clock.

A signal S2' output from the flip-flop 35, the external reset request signal RST0', and a signal S3' output from the operation state machine 31 are input to the selector 36. The selector 36 outputs the signal S2' or the external reset request signal RST0' in accordance with the signal S3'. Namely, the selector 36 outputs the signal S2' when the signal S3' is "H" (synchronous reset mode), and outputs the external reset request signal RST0' when the signal S3' is "L" (asynchronous reset mode).

The clock transfer circuit 37 includes flip-flops 37A, 37B connected in series, and an output of the selector 36 is input thereto. A clock CLK0' (for example, a clock oscillated from the low-speed CR oscillation circuit) constantly supplied regardless of the operation state is input to the flip-flops 37A, 37B as a clock. An output of the clock transfer circuit 37 is output as the internal reset signal RST2'.

Figure 5:
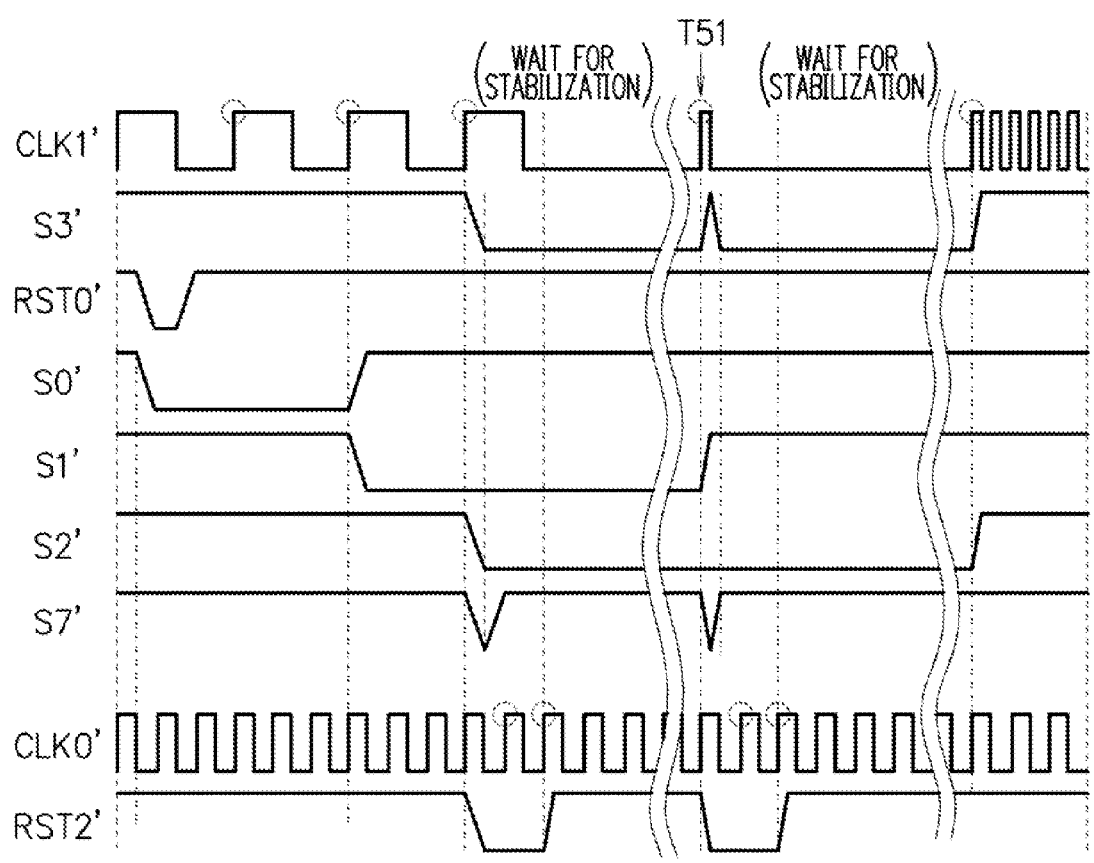
FIG. 5 is a diagram illustrating an example of operational waveforms of the reset generation unit illustrated in FIG. 3.

Operations when the external reset request signal RST0' is asserted in the reset generation unit illustrated in FIG. 3 are described (it is assumed that the power-on-reset request signal RST1' is not asserted). When the external reset request signal RST0' is asserted, the internal reset signal RST2' is asserted by the selector 36 and the clock transfer circuit 37 in the asynchronous reset mode. On the other hand, the internal reset signal RST2' is asserted by propagating the clock transfer circuits 33, 34, the flip-flop 35, the selector 36, and the clock transfer circuit 37 as illustrated in FIG. 5 in the synchronous reset mode.

Here, there is a possibility in the reset generation unit illustrated in FIG. 3 in which the reset request from external input at the transition time of the operation state is cancelled. For example, it is assumed that the external reset request signal RST0' is held by the flip-flop for synchronization operated by the system clock, and the external reset request signal RST0' is deasserted right away. After that, if the operation state transfers from the synchronous reset mode to the asynchronous reset mode just before the internal reset signal RST2' is asserted based on a synchronous reset request (before propagation to the selector 36), the synchronous reset request is cancelled.

Besides, the operation state transfers to "INIT" by the reset and the supply of the system clock is stopped even if the internal reset signal RST2' is asserted, and therefore, a reset factor based on the reset request remains in the flip-flop for synchronization. Accordingly, the internal reset signal RST2' is asserted again when an oscillation clock stabilization wait is finished, and the supply of the system clock starts (refer to a time T51 in FIG. 5). Besides, there also is a possibility in which the selector 36 gives glitch at a change time between the synchronous reset mode and the asynchronous reset mode, and the internal reset signal RST2' is unnecessarily asserted.

Figure 6:
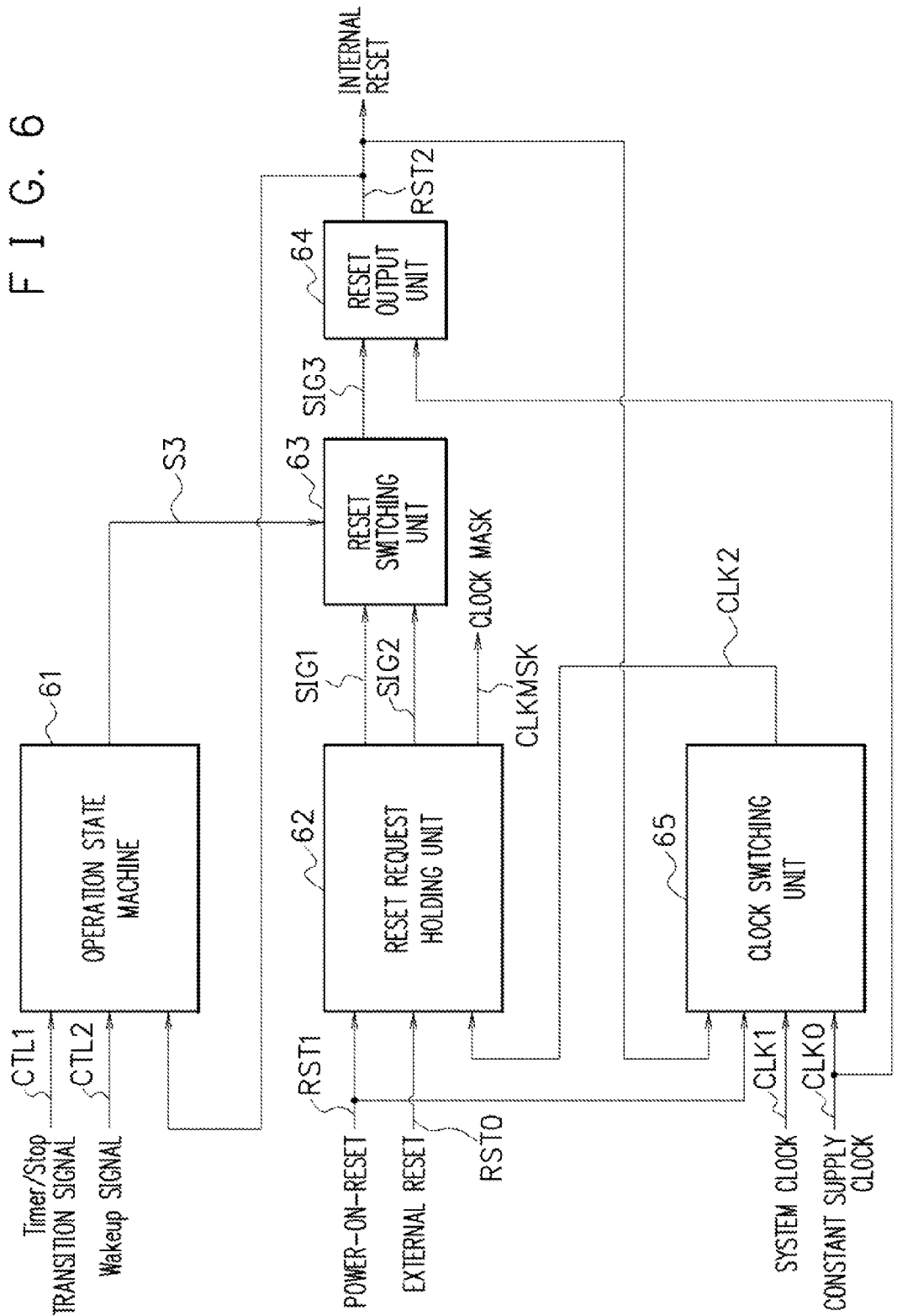
FIG. 6 is a diagram illustrating a configuration example of a reset generation unit in the present embodiment.

The reset generation unit in the present embodiment described below is to solve the problems as stated above. FIG. 6 is a diagram illustrating a configuration example of the reset generation unit in the present embodiment. The reset generation unit in the present embodiment includes an operation state machine 61, a reset request holding unit 62, a reset switching unit 63, a reset output unit 64, and a clock switching unit 65 as illustrated in FIG. 6.

The operation state machine 61 corresponds to the operation state machine 31 illustrated in FIG. 3. The Timer/Stop transition signal CTL1, the Wakeup signal CTL2, an internal reset signal RST2 and so on are input to the operation state machine 61. The operation state machine 61 controls the operation state in accordance with these signals. Note that the transition of the operation state is the same as the transition of the operation state at the operation state machine 31 illustrated in FIG. 4. Besides, the operation state machine 61 sets a signal S3 at "L" in the asynchronous reset mode, and sets the signal S3 at "H" in the synchronous reset mode.

A power-on-reset request signal RST1, an external reset request signal RST0, and a reset clock CLK2 are input to the reset request holding unit 62. When the external reset request signal RST0 is asserted, the reset request holding unit 62 holds the external reset request signal RST0 by using a flip-flop for synchronization operated by the reset clock CLK2. The reset request holding unit 62 asserts a signal SIG1 during a period when the reset factor based on the external reset request signal RST0 is held at the flip-flop for synchronization. Besides, the reset request holding unit 62 asynchronously asserts a signal SIG2 when the external reset request signal RST0 is asserted. Namely, the signal SIG1 represents presence/absence of the synchronous reset request, and the signal SIG2 represents presence/absence of an asynchronous reset request. Besides, the reset request holding unit 62 outputs a clock mask signal CLKMSK to stop a supply of a system clock CLK1.

The signal S3 output from the operation state machine 61 and the signals SIG1, SIG2 output from the reset request holding unit 62 are input to the reset switching unit 63. When the signal S3 is "L" (asynchronous reset mode), the reset switching unit 63 asserts a signal SIG3 during a period when at least one of the signals SIG1, SIG2 is asserted. On the other hand, when the signal S3 is in "H" (synchronous reset mode), the reset switching unit 63 asserts the signal SIG3 during the period when the signal SIG1 is asserted.

The signal SIG3 output from the reset switching unit 63 and a constant supply clock CLK0 constantly supplied regardless of the operation state are input to the reset output unit 64. The reset output unit 64 outputs the internal reset signal RST2 in accordance with the signal SIG3.

The clock switching unit 65 switches whether the constant supply clock CLK0 is supplied or the system clock CLK1 is supplied as the reset clock CLK2. The constant supply clock CLK0, the system clock CLK1, the power-on-reset request signal RST1, and the internal reset signal RST2 are input to the clock switching unit 65. The clock switching unit 65 supplies the constant supply clock CLK0 as the reset clock CLK2 when the internal reset signal RST2 is asserted and the supply of the system clock CLK1 is stopped.

Figure 7:
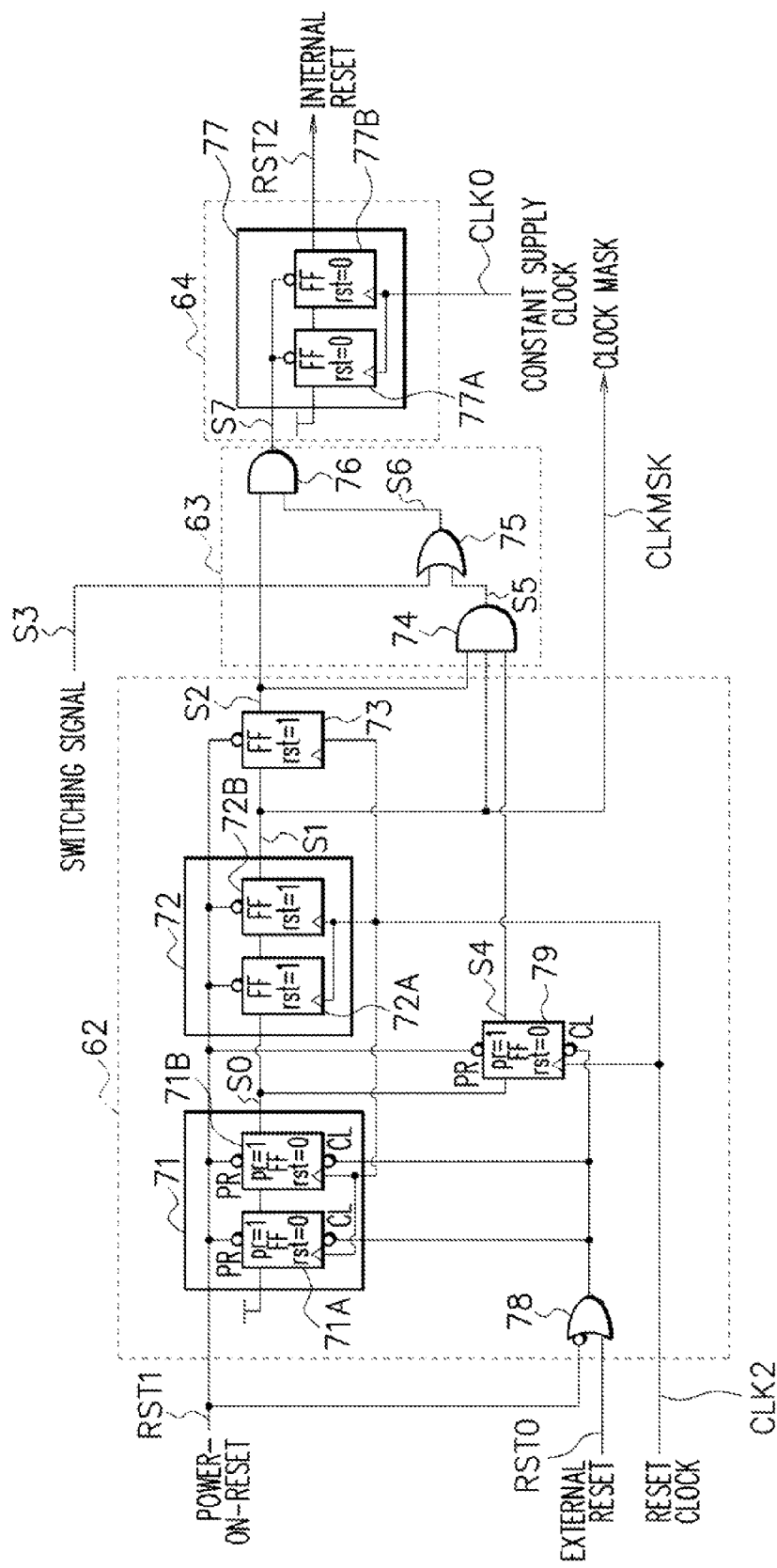
FIG. 7 is a diagram illustrating a circuit configuration example of a reset request holding unit, a reset switching unit, and a reset output unit in the present embodiment.

FIG. 7 is a diagram illustrating a circuit configuration example of the reset request holding unit 62, the reset switching unit 63, and the reset output unit 64 in the present embodiment.

The reset request holding unit 62 includes clock transfer circuits 71, 72, flip-flops 73, 79, and an OR circuit 78. The power-on-reset request signal RST1 is inverted and input, and the external reset request signal RST0 is input to the OR circuit 78, and the OR circuit 78 outputs an operation result thereof. Namely, the OR circuit 78 outputs "L" when the power-on-reset request signal RST1 is not asserted and the external reset request signal RST0 is asserted.

The clock transfer circuit 71 includes flip-flops 71A, 71B with clear and preset connected in series. The output of the OR circuit 78 is input to a clear terminal, and the power-on-reset request signal RST1 is input to a preset terminal of each of the flip-flops 71A, 71B. Besides, the clock transfer circuit 72 includes flip-flops 72A, 72B connected in series, and an output of the clock transfer circuit 71 is input thereto. The power-on-reset request signal RST1 is also input to the flip-flops 72A, 72B. An output of the clock transfer circuit 72 and the power-on-reset request signal RST1 are input to the flip-flop 73. The reset clock CLK2 is input to the above-stated flip-flops 71A, 71B, 72A, 72B, and 73 as a clock.

All of the flip-flops 71A, 71B, 72A, 72B, and 73 output "1" ("H") when the power-on-reset request signal RST1 is asserted. Accordingly, all of signals S0, S1, S2 output from the clock transfer circuits 71, 72, and the flip-flop 73 become "H". All of the flip-flops 71A, 71B output "0" (zero) ("L") if the output of the OR circuit 78 becomes "L" when the power-on-reset request signal RST1 is not asserted and the external reset request signal RST0 is asserted. Accordingly, the signal S0 output from the clock transfer circuit 71 becomes "L", and it is sequentially propagated to the clock transfer circuit 72 and the flip-flop 73 in accordance with the reset clock CLK2.

The flip-flop 79 is a flip-flop with clear and preset. The flip-flop 79 outputs "1" ("H") when the power-on-reset request signal RST1 is asserted. Besides, the flip-flop 79 outputs "0" (zero) ("L") when the power-on-reset request signal RST1 is not asserted and the external reset request signal RST0 is asserted. Besides, the flip-flop 79 outputs the signal S0 in synchronization with the reset clock CLK2 when neither the external reset request signal RST0 nor the power-on-reset request signal RST1 are asserted. In other words, the flip-flop 79 sets a signal S4 at "L" if the external reset request signal RST0 is asserted or the signal S0 becomes "L" when the power-on-reset request signal RST1 is not asserted.

The reset switching unit 63 includes AND circuits (logical product operation circuits) 74, 76 and an OR circuit 75. The signals S4, S1, S2 output from the reset request holding unit 62, namely, the outputs of the flip-flop 79, the clock transfer circuit 72, and the flip-flop 73 are input to the AND circuit 74. The AND circuit 74 performs a logical product operation of the signals S4, S1, S2, and outputs the operation result as a signal S5. The signal S3 output from the operation state machine 61 and the signal S5 output from the AND circuit 74 are input to the OR circuit 75, and the OR circuit 75 outputs the operation result as a signal S6. Besides, the signal S2 output from the reset request holding unit 62 and the signal S6 output from the OR circuit 75 are input to the AND circuit 76, and the AND circuit 76 outputs the operation result as a signal S7. The reset switching unit 63 is constituted as stated above, and thereby, the signal S7 at "L" is output when the signal S2 is "L", or when the signal S3 is "L" and either of the signals S4, S1, S2 is "L".

As stated above, the reset switching unit 63 treats a result in which all signals relating to the reset request from the reset request holding unit 62 are AND operated as an asynchronous reset request signal, and the output S2 of the flip-flop 73 at a final stage of the reset request holding unit 62 as a synchronous reset request signal. The asynchronous reset request signal is OR-operated with the signal S3 from the operation state machine 61 to be output. The signal and the synchronous reset request signal are AND-operated, and the result is set as the internal reset request signal.

Besides, the reset switching unit 63 is made up of a combination circuit to enable to assert the asynchronous reset request, too. A configuration of the combination circuit is a circuit configuration in which the glitch does not occur even when the selection between synchronization and asynchronization is switched. Besides, the reset request is not cancelled even when the mode changes from the synchronous reset mode to the asynchronous reset mode just before the internal reset signal RST2 is asserted because the internal reset signal is asserted based on all of the signals relating to the reset request held at the reset request holding unit 62.

The reset output unit 64 includes a clock transfer circuit 77. The clock transfer circuit 77 includes flip-flops 77A, 77B connected in series, and the signal S7 output from the reset switching unit 63 is input thereto. The reset output unit 64 asserts the internal reset signal RST2 in a period when the signal S7 is "L" and a period of one clock from when the signal S7 changes from "L" to "H". That is, the internal reset signal RST2 changes from "L" to "H" after two clocks from when the signal S7 changes from "L" to "H".

FIG. 8A is a diagram illustrating a circuit configuration example of the clock switching unit 65 in the present embodiment. The clock switching unit 65 includes clock transfer circuits 81, 86, flip-flops 82, 87, AND circuits 83, 85, 89, a gated clock buffer macro 84, an inverter 88, a gated clock buffer 90, and an OR circuit 91 as illustrated in FIG. 8A. The gated clock buffer macro 84 includes a latch 92 and an AND circuit 93 as illustrated in FIG. 8B.

When the power-on-reset request signal RST1 and the internal reset signal RST2 are not asserted (the system clock is assumed to be supplied), an output S13 of the AND circuit 85 is "L", and therefore, an output S16 of the inverter 88 becomes "H", and an output S17 of the AND circuit 89 becomes "L". Besides, the output S16 of the inverter 88 is "H", and therefore, an output of the AND circuit 83 is "H". Accordingly, the constant supply clock CLK0 is shut-off by the gated clock buffer 90, and the system clock CLK1 is output as the reset clock CLK2 via the OR circuit 91.

When the internal reset signal RST2 is asserted under this state, the output of the AND circuit 83 changes into "L", and the output S13 of the AND circuit 85 changes into "H". An output of the AND circuit 89 becomes "H" after three clocks by the constant supply clock CLK0 since the output S13 of the AND circuit 85 changes into "H". Accordingly, the constant supply clock CLK0 is output as the reset clock CLK2 via the OR circuit 91.

After that, when the internal reset signal RST2 is deasserted, the output S13 of the AND circuit 85 changes into "L". The output of the AND circuit 89 becomes "L" after two clocks by the constant supply clock CLK0 since the output S13 of the AND circuit 85 changes into "L". The output S16 of the inverter 88 becomes "H" after three clocks by the constant supply clock CLK0 since the output S13 of the AND circuit 85 changes into "L". When the supply of the system clock CLK1 is started, the output of the AND circuit 83 changes into "H". Accordingly, the constant supply clock CLK0 is shut-off by the gated clock buffer 90, and the system clock CLK1 is output again as the reset clock CLK2 via the OR circuit 91. As stated above, it is possible to switch the reset clock CLK2 without generating glitch at a synchronous reset time by performing the clock switching by the clock switching unit 65.

FIG. 9 is a diagram illustrating an example of operational waveforms of the reset generation unit in the present embodiment.

When the external reset request signal RST0 is asserted under a state in which the operation state is "RUN" (the synchronous reset mode: the signal S3 is "H"), the output S1 of the clock transfer circuit 71 becomes "L". Accordingly, the output S4 of the flip-flop 79 becomes "L" and the output of the AND circuit 74 becomes "L", but the signal S6 and the output S7 of the reset switching unit 63 maintain "H" because the signal S3 is "H".

The signal S2 becomes "L" after three cycles by the reset clock CLK2 have passed since the external reset request signal RST0 is asserted. The output S7 of the reset switching unit 63 thereby changes into "L" and the internal reset signal RST2 is asserted. Besides, the supply of the system clock CLK1 is stopped.

Subsequently, the supply of the constant supply clock CLK0 is started as the reset clock CLK2 after three cycles by the constant supply clock CLK0 have passed since the internal reset signal RST2 is asserted. The clock is thereby supplied to the flip-flops 71A, 71B, 72A, 72B, and 73 inside the reset request holding unit 62, and the reset factor based on the external reset request signal RST0 held at the reset request holding unit 62 is output toward outside of the reset request holding unit 62.

The supply of the system clock CLK1 is started as the reset clock CLK2 and the operation state transfers to "RUN" (synchronous reset mode) again when the reset by the internal reset signal RST2 is finished and the system clock becomes to be supplied stably.

According to the present embodiment described hereinabove, it is possible to switch whether the internal reset signal is synchronously asserted under the operation state in which the system clock is supplied to the clock reset generation circuit, or the internal reset signal is asynchronously asserted under the operation state in which the system clock is not supplied to the clock reset generation circuit when the reset request from external is input, without causing problems occurred when they are simply combined.

The disclosed semiconductor device is able to appropriately switch whether the reset signal is synchronously output or the reset signal is asynchronously output in accordance with the operation states when the reset request from external is input.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor device, comprising:
   a reset request holding unit configured to hold a reset request from external, wherein the reset request holding unit comprises a plurality of holding units connected in series;
   a reset switching unit configured to:
      perform a first logical product operation of outputs of the plurality of holding units to set an operation result of the first logical product operation as an asynchronous reset request,
      set an output of the reset request holding unit at a final stage of the plurality of holding units as a synchronous reset request,
      perform a second logical product operation of the asynchronous reset request and the synchronous reset request,
      output an operation result of the second logical product operation, and
      mask the asynchronous reset request in a synchronous reset mode;
   a reset output unit configured to output a reset signal based on the operation result output from the reset switching unit; and
   a clock switching unit configured to switch based on whether a first clock is supplied to the reset request holding unit in response to the reset signal being asserted or a second clock is supplied to the reset request holding unit in response to the reset signal being absent,
   wherein the plurality of holding units of the reset request holding unit is configured to operate based on the clock supplied from the clock switching unit.

2. The semiconductor device according to claim 1, wherein the second clock is stopped when the reset signal is asserted.

3. The semiconductor device according to claim 1, wherein the reset request holding unit comprises a clock transfer circuit comprising two flip-flops connected in series.

4. The semiconductor device according to claim 1, wherein the reset switching unit comprises a combination circuit.

5. The semiconductor device according to claim 1, further comprising a first gated clock buffer configured to shut off a supply of the first clock to the reset request holding unit when the reset signal is absent.

6. The semiconductor device according to claim 1, further comprising a second gated clock buffer configured to shut off a supply of the second clock to the reset request holding unit when the reset signal is asserted.

7. A semiconductor device, comprising:
   a reset request holding unit configured to hold a reset request from external, wherein the reset request holding unit comprises a plurality of holding units connected in series;
   a first logical product operation unit configured to perform a logical product operation of outputs of the plurality of holding units;
   a mask unit configured to mask an output of the first logical product operation unit in a synchronous reset mode;
   a second logical product operation unit configured to perform a logical product operation of an output of the first logical product operation unit processed by the mask unit and an output of the holding unit at a final stage of the plurality of holding units;
   a reset output unit configured to output a reset signal based on an output of the second logical product operation unit; and
   a clock switching unit configured to switch based on whether a first clock is supplied to the reset request holding unit in response to the reset signal being asserted or a second clock is supplied to the reset request holding unit in response to the reset signal being absent,
   wherein the plurality of holding units of the reset request holding unit is configured to operate based on the clock supplied from the clock switching unit.

8. The semiconductor device according to claim 7, further comprising:
   a first gated clock buffer configured to shut off a supply of the first clock to the reset request holding unit when the reset signal is not asserted; and
   a second gated clock buffer configured to shut off a supply of the second clock to the reset request holding unit when the reset signal is asserted.

9. The semiconductor device according to claim 7, wherein the reset request holding unit comprises a clock transfer circuit comprising two flip-flops connected in series.

10. A reset control method in a semiconductor device, comprising:
- holding reset request from external by using a plurality of holding units connected in series;
- performing a first logical product operation of outputs of the plurality of holding units to set an operation result of the first logical product operation as an asynchronous reset request;
- setting an output of the holding unit at a final stage of the plurality of holding units as a synchronous reset request;
- masking the asynchronous reset request in a synchronous reset mode;
- performing a second logical product operation of the asynchronous reset request and the synchronous reset request;
- outputting an operation result of the second logical product operation;
- outputting a reset signal based on the output operation result of the second logical product operation of the asynchronous reset request and the synchronous reset request; and
- switching, using a clock switching unit, based on whether a first clock is supplied to the reset request holding unit in response to the reset signal being asserted or a second clock is supplied to the reset request holding unit in response to the reset signal being absent, wherein the plurality of holding units of the reset request holding unit operates based on the clock supplied from the clock switching unit.

11. The method according to claim 10, wherein the second clock is stopped when the reset signal is asserted.

12. The method according to claim 10, further comprising shutting off, using a first gated clock buffer, a supply of the first clock to the reset request holding unit when the reset signal is absent.

13. The method according to claim 10, further comprising shutting off, using a second gated clock buffer, a supply of the second clock to the reset request holding unit when the reset signal is asserted.

* * * * *